(12) United States Patent
Watanabe

(10) Patent No.: US 6,310,624 B1
(45) Date of Patent: *Oct. 30, 2001

(54) METHOD AND APPARATUS FOR GENERATING CHARACTER PATTERN

(75) Inventor: Kiyoshi Watanabe, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/185,229

(22) Filed: Jan. 24, 1994

Related U.S. Application Data

(63) Continuation of application No. 07/711,991, filed on Jun. 7, 1991, now abandoned.

(30) Foreign Application Priority Data

Jun. 11, 1990 (JP) .................................................. 2-149811

(51) Int. Cl.⁷ ...................................................... G09G 5/22
(52) U.S. Cl. .................................... 345/467; 345/472
(58) Field of Search ........................ 345/128, 141, 345/127; 382/69; 400/171; 178/30; 395/167

(56) References Cited

U.S. PATENT DOCUMENTS

| | | | | |
|---|---|---|---|---|
| 4,053,878 | * | 10/1977 | Cannon | 345/194 |
| 4,459,586 | * | 7/1984 | McVey | 345/141 |
| 4,686,525 | * | 8/1987 | Nagata | 340/735 |
| 5,103,303 | * | 4/1992 | Shoji et al. | 358/75 |
| 5,175,811 | * | 12/1992 | Sone et al. | 345/194 |
| 5,295,240 | * | 3/1994 | Kajimoto | 395/151 |
| 5,444,829 | * | 8/1995 | Kawabata et al. | 395/100 |
| 5,475,809 | * | 12/1995 | Sato | 395/151 |
| 5,542,050 | * | 7/1996 | Onozawa | 395/110 |

FOREIGN PATENT DOCUMENTS

| | | | |
|---|---|---|---|
| 2638264 | 4/1990 | (FR) | G06K/9/00 |
| 2224420 | 5/1990 | (GB) . | |
| 63-300356 | * 7/1988 | (JP) . | |
| 1230093 | * 9/1989 | (JP) | 345/128 |
| 2083583 | * 3/1990 | (JP) | 345/129 |
| 3246595 | * 1/1991 | (JP) . | |

OTHER PUBLICATIONS

"Vector Character Fonts in an All–Points–Addressable Printer", in I.B.M. Technical Disclosure Bulletin, vol. 28, No. 11 (4/86).

* cited by examiner

*Primary Examiner*—Amare Mengistu
(74) *Attorney, Agent, or Firm*—Fitzpatrick, Cella, Harper & Scinto

(57) ABSTRACT

An apparatus for generating a character pattern includes a first memory for storing reference character font data as a coordinate point array, a second memory for storing parameter data in correspondence with at least character size data, and a generator for generating size data of a target character on the basis of the parameter data. Font data corresponding to an input character code is read out from the first memory and is developed into pattern data of a size corresponding to character size data converted by the generator. A method of generating a character pattern for the above apparatus is also disclosed.

38 Claims, 5 Drawing Sheets

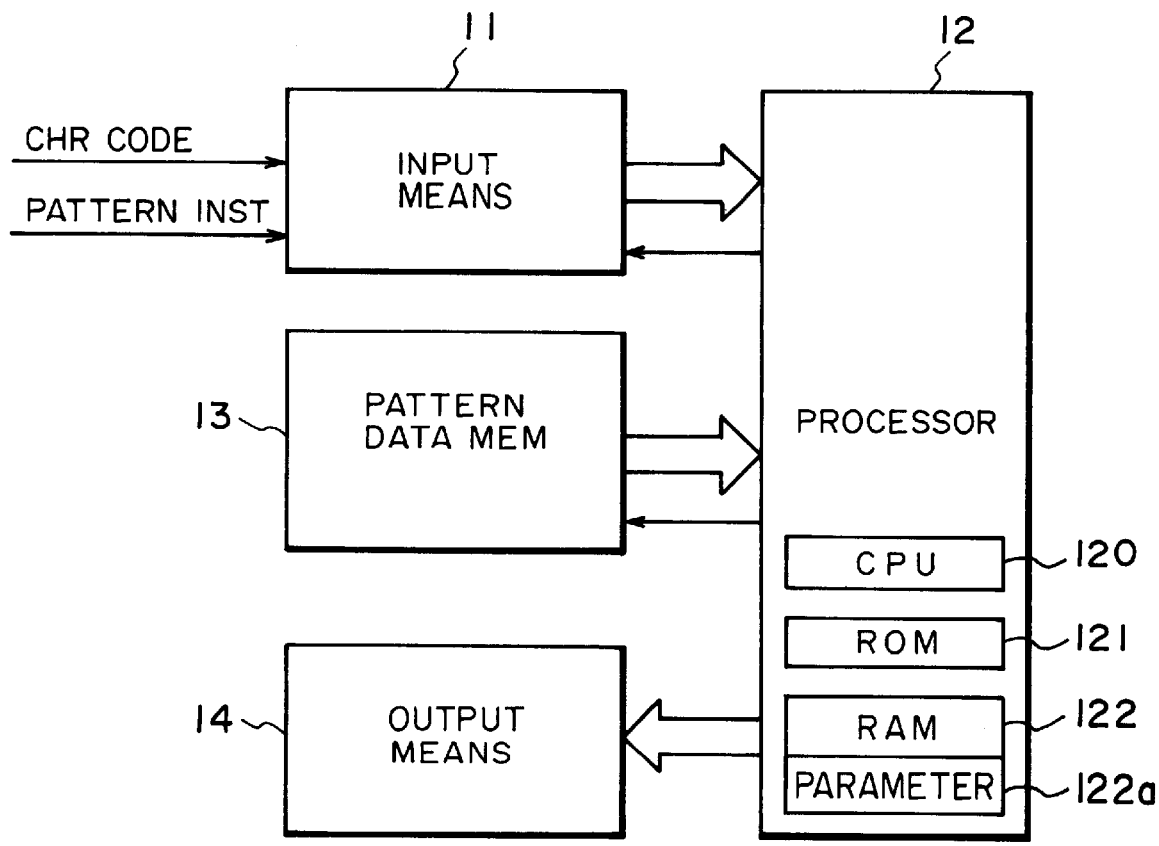
F I G. 1

METHOD AND APPARATUS FOR GENERATING CHARACTER PATTERN

This application is a continuation of application Ser. No. 07/711,991, filed Jun. 7, 1991, now abandoned.

BACKGROUND OF THE INVENTION

1. Field of the Invention

The present invention relates to a method and apparatus for generating a character pattern, wherein reference character data are defined as a coordinate point array on a stroke or edge, these coordinate points are developed into character pattern data corresponding to a designated character size, and the developed character pattern data is output.

2. Related Background Art

In a conventional character pattern generator for receiving a character code and generating a character pattern corresponding to the input character code, character pattern data of each size is stored in a bit map font format, and dot pattern data corresponding to an input character code is read out and is used to display and print out data. When font data is stored in such a dot pattern format, character patterns of all sizes for each character pattern must be stored, and the required capacity of a font memory is greatly increased. A printer, a display unit, and the like capable of generating character patterns having various sizes are available in which font data representing a so-called vector or outline font capable of generating character patterns having free sizes ranging from a large size to a small size for each alphabetic character can be stored.

The most important advantage of the so-called vector, outline or scalable font is that characters having free sizes ranging from a small size to a large size can be generated for each alphabetic character, as described above. However, when a character pattern having a small size is to be generated, this character pattern is deformed, and readability of the character is degraded. This is mainly because an area for displaying and outputting the character is small, and line segments constituting the character contact each other. This phenomenon typically occurs in multi-stroke kanji characters such as "鷺, 鳶, 漁, 薯, 襄, 爲, and 欒". No countermeasures are taken for this "deformation" phenomenon in conventional printers and display units.

Even in a most advanced conventional device, font data designed to prevent this "deformation" phenomenon is prepared in advance. When pattern data of a given character expected to cause the "deformation" phenomenon is to be generated, the prepared font data is used to develop the corresponding character into a pattern. This arrangement, however, requires a memory for storing special font data. It is not economical to prepare these font data for all characters for small character patterns which may cause the "deformation" phenomenon.

The most important factor in the field of printing is readability, i.e., an easy-to-read printed document. For example, when characters are arranged to compose a sentence by using characters each of which has a face of a character designed to fully extend within a character frame and which has a predetermined relationship between the character size and the character face size, no problem is posed by a relatively large character size of 16 points or more. However, when the character size is decreased, adjacent characters adversely affect each other and become contiguous with each other, thereby greatly degrading readability of the character arrangement. To the contrary, when a character having a face designed to be smaller than a body frame in advance is used, the "deformation" phenomenon of the character arrangement using a smaller point can be prevented. However, a character arrangement having a large character size looks sparse, thus degrading readability.

In a character pattern generator using the outline or vector font described above, since a relationship between the character size and the character face size is predetermined regardless of different output sizes, a character having a small size is difficult to read.

SUMMARY OF THE INVENTION

The present invention has been made in consideration of the above conventional problems, and has as its object to provide a method and apparatus for generating a character pattern, wherein when character patterns having various sizes are to be output, parameter data are multiplied with size data to output character patterns having optimal sizes for character arrangements.

It is another object of the present invention to provide a method and apparatus for generating a character pattern, wherein when a character pattern having a specific size is to be generated, the width of a line segment constituting this character pattern is adjusted to suppress a character "deformation" phenomenon, thereby outputting an easy-to-read character pattern.

It is still another object of the present invention to provide a method and apparatus for generating a character pattern, the apparatus for storing reference character font data as a coordinate point array on a character stroke or edge and generating character pattern data corresponding to an input character code on the basis of the character font data, comprising memory means for storing parameter data in correspondence with types of characters and/or character size data, means for converting the character size date in accordance with the parameter data, and pattern developing means for reading out the font data corresponding to the input character code and developing the readout font data into pattern data having the character size converted by the converting means.

It is still another object of the present invention to provide a method and apparatus for generating a character pattern, the apparatus for storing reference character font data as a coordinate point array on a character stroke or edge and generating character pattern data corresponding to an input character code on the basis of the character font data, comprising memory means for storing density data in correspondence with types of characters and/or character size data, pattern developing means for reading out the font data corresponding to the input character code and developing the readout font data into pattern data having a designated character size, and line segment width adjusting means for changing, on the basis of the density data, a line segment width of a character pattern-developed by the pattern developing means.

It is still another object of the present invention to provide a method and apparatus for generating a character pattern, the method comprising the steps of storing parameter data in correspondence to a type of character and/or character size data, converting designated character size data in accordance with the parameter data, reading out font data corresponding to an input character code, and developing the readout font data into pattern data having a converted character size.

It is still another object of the present invention to provide a method and apparatus for generating a character pattern, the method comprising the steps of storing density data in correspondence with a type of character and/or character size data, reading out font data corresponding to an input character code, and changing a line segment width of a character developed by the pattern data having the designated character size.

BRIEF DESCRIPTION OF THE DRAWINGS

FIG. 1 is a block diagram showing a schematic arrangement of a character pattern generator according to the first embodiment of the present invention;

DETAILED DESCRIPTION OF THE PREFERRED EMBODIMENTS

Preferred embodiments of the present invention will be described in detail with reference to the accompanying drawings. It should be noted that the present invention can be realized by an apparatus or a system consisting of a plurality of apparatuses and also incorporates its realization by supplying a program to an apparatus or system.

[Description of Character Pattern Generator (FIG. 1)]

FIG. 1 is a block diagram showing a schematic arrangement of a character pattern generator according to the first embodiment.

Referring to FIG. 1, an input means 11 receives a character code signal, a pattern generation instruction, and the like for an output target from an external device (not shown). The input means 11 includes signal hold circuits such as a buffer and a flip-flop. A processor 12 is connected to the input means 11. The processor 12 generates a character pattern of a designated size and a designated font in accordance with a character code signal and a pattern generation instruction input from the input means 11. The processor 12 comprises a central processing unit (CPU) 120, a ROM 121 for storing control programs of the CPU 120 and various data, a RAM 122 used as a work area of the CPU 120, and the like.

A pattern data memory 13 prestores character pattern and character attribute data constituted by character edges as a set of coordinate points at memory addresses corresponding to character codes. The pattern data memory 13 comprises a disk or a nonvolatile memory (e.g., a read-only memory). The processor 12 is connected to an output means 14. The output means 14 displays and outputs a character pattern processed by the processor 12. The output means 14 includes a signal hold circuit, a parallel/serial signal converter, and a printing unit/display unit such as a printer or display. The operations of the input means 11, the pattern data memory 13, and the output means 14 are controlled by the processor 12.

[Description of Operation (FIGS. 1 & 2)]

Figure 2:
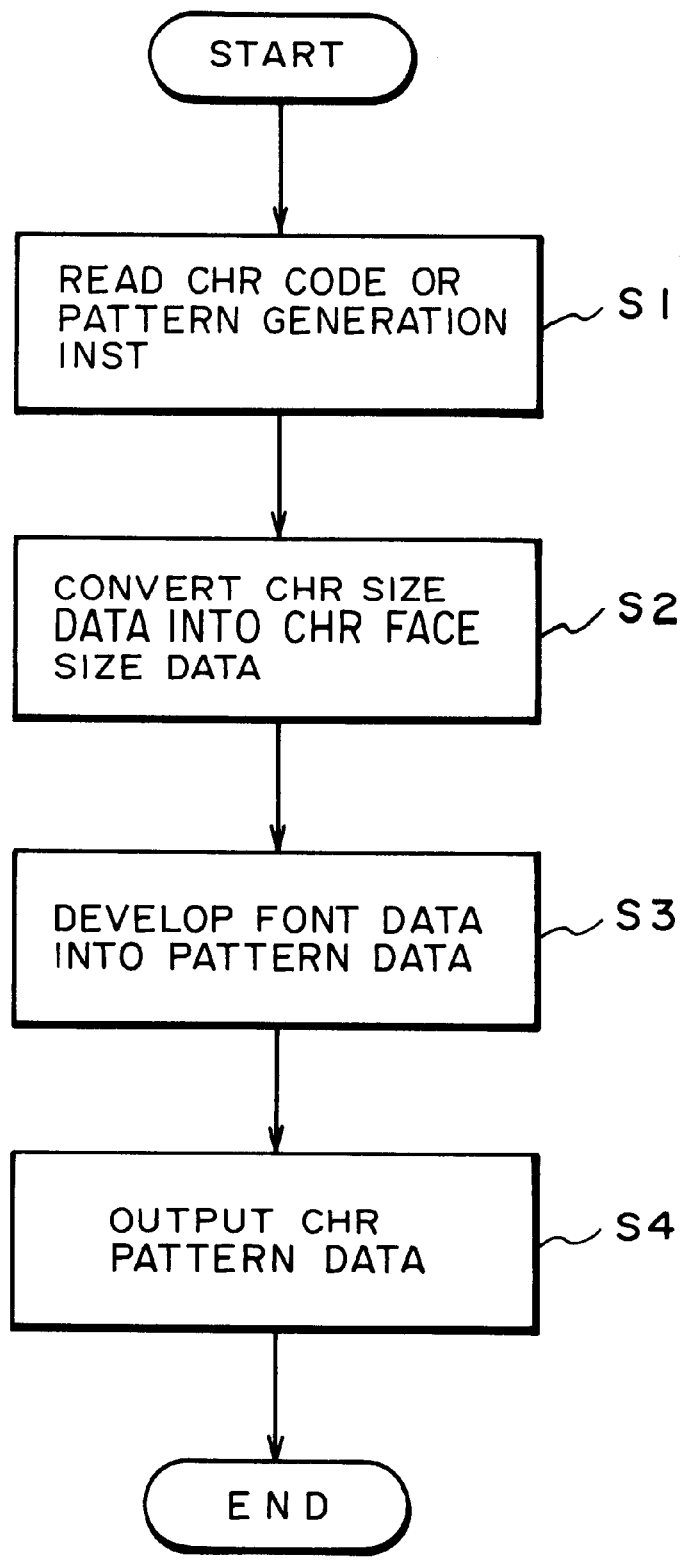
FIG. 2 is a flow chart showing character pattern generation processing in the character pattern generator according to the first embodiment.

An operation of the character pattern generator shown in FIG. 1 will be described with reference to a flow chart in FIG. 2. The control sequence in FIG. 2 is stored in the ROM 121 in the processor 12 and is executed by the CPU 120.

This processing sequence is started when a character code signal, a pattern generation instruction, or the like is input from the input means 11. In step S1, a character code input from the input means 11 is read. In step S2, designated character size data is input and is converted into character face in the RAM 122 in correspondence with each character size value. For example, assume that a designated character size is given as 10 points. If the parameter value 122a corresponding to this character size is 0.98, an actual character face size is calculated as 0.98 (=10×0.98) points.

This parameter value 122a is assigned corresponding to each character size (e.g., 10, 11, and 12 points). The input character size is multiplied with the corresponding parameter value, so that this character pattern can be displayed and output in a character pattern format having a size slightly smaller than the designated character size. At this time, a character feed amount of characters displayed and output at the output means 14 is kept unchanged. Therefore, even if the character size is reduced, an easy-to-read document can be printed or displayed.

The flow advances to step S3. The front data read out from the pattern data memory 13 is developed into a pattern on the basis of the character face size data obtained in step S2. The flow then advances to step S4. The pattern-developed character pattern data is output from the processor 12 to the output means 14, and the processing is ended. Note that an output destination of the pattern data is any target such as a printing system or any target capable of transmitting data electrically, magnetically or in a format converted from the electrical or magnetic system (e.g., a CRT and a telephone line).

According to the first embodiment, as described above, designated character size data is replaced with any character face size data by using a parameter to generate a character pattern. Therefore, even if a character pattern has a free size, it can have high readability and can be output.

[Description of Second Embodiment (FIGS. 3 & 4)]

Figure 3:
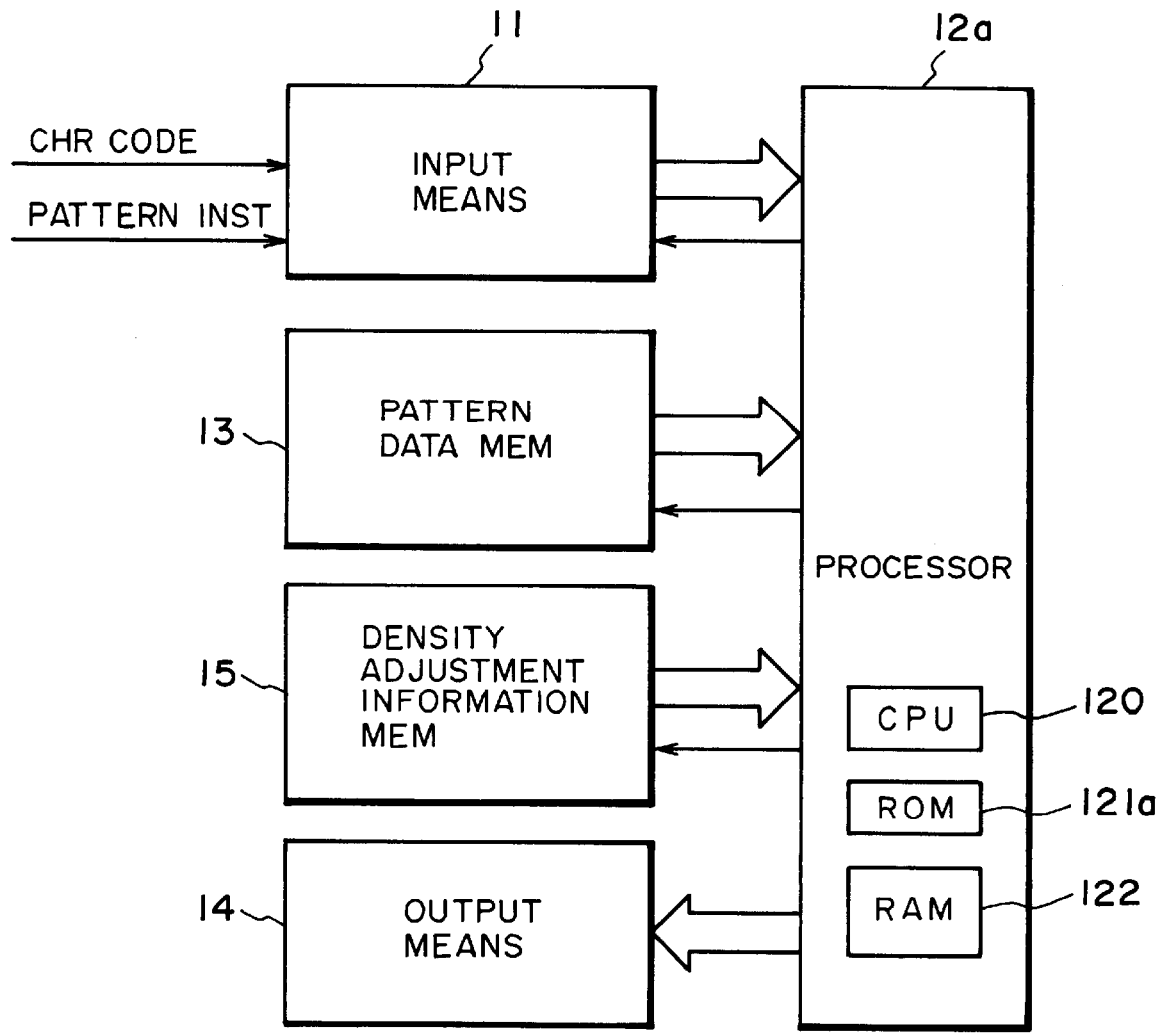
FIG. 3 is a block diagram showing a schematic arrangement of a character pattern generator according to the second embodiment of the present invention.

FIG. 3 is a block diagram showing a schematic arrangement of a character pattern generator according to the second embodiment. The same reference numerals as in the character pattern generator of FIG. 1 denote the same parts in FIG. 3, and a detailed description thereof will be omitted.

Referring to FIG. 3, a density adjustment data memory 15 prestores data representing whether density adjustment is performed at the time of generation of a character pattern in correspondence with data representing a type of character and a character size. This density adjustment is particular processing for changing a line segment width of a pattern whose character size is converted. In particular, when a character pattern having a small size is to be generated, the line width of the character is decreased to prevent the character "deformation" phenomenon which is caused by contact between adjacent line segments constituting a character or characters.

Figure 4:
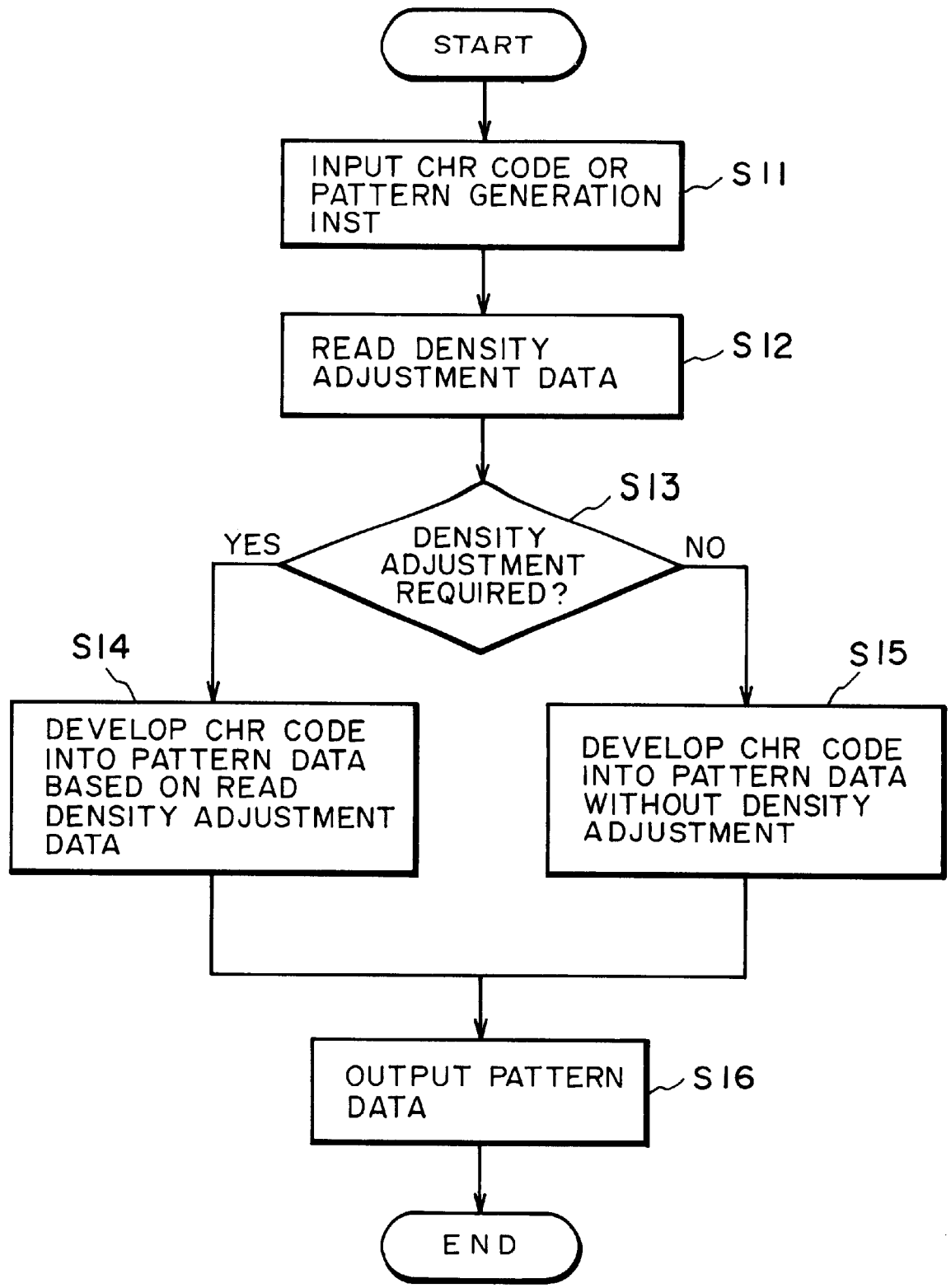
FIG. 4 is a flow chart showing character pattern generation processing in the character pattern generator according to the second embodiment.

FIG. 4 is a flow chart showing character pattern generation processing in the character pattern generator of the second embodiment. A control program for executing this processing is stored in a ROM 121a in a processor 12a.

In step S11, a character code, a character pattern generation instruction, or the like is input from an input means 11, and density adjustment data of a character corresponding to the input pattern or instruction is read out from the density adjustment data memory 15 on the basis of the type of character or the character size data in step S12.

The flow advances to step S13 to determine on the basis of the density adjustment data whether density adjustment must be performed. If YES in step S13, the flow advances to step S14. Pattern data of the corresponding character is generated in accordance with the font data corresponding to the character code and read out from a pattern data memory 13. At this time, processing such as thinning of (narrowing) line segments of this character pattern is performed. However, if NO in step S13, the flow advances to step S15 to develop this character code into pattern data as in normal pattern development.

When the character pattern data corresponding to the character code input in step S11 is generated in step S14 or S15, the flow advances to step S16, and this pattern data is supplied to an output means 14, thereby printing it on recording paper or displaying it on a display.

According to the second embodiment, as described above, even if a character having a small size is to be generated, the character pattern is not subjected to the character "deformation" phenomenon. Therefore, a character having high readability can be displayed and output.

[Description of Laser Beam Printer (FIG. 5)]

An arrangement of a laser beam printer 140 applicable to the output means 14 of this embodiment will be described with reference to FIG. 5. The present invention is not limited to the laser beam printer 140, but may be applied to a bubble-jet printer, an aerojet printer for injecting an ink by utilizing an air flow, a thermal printer, and the like, as a matter of course.

Figure 5:
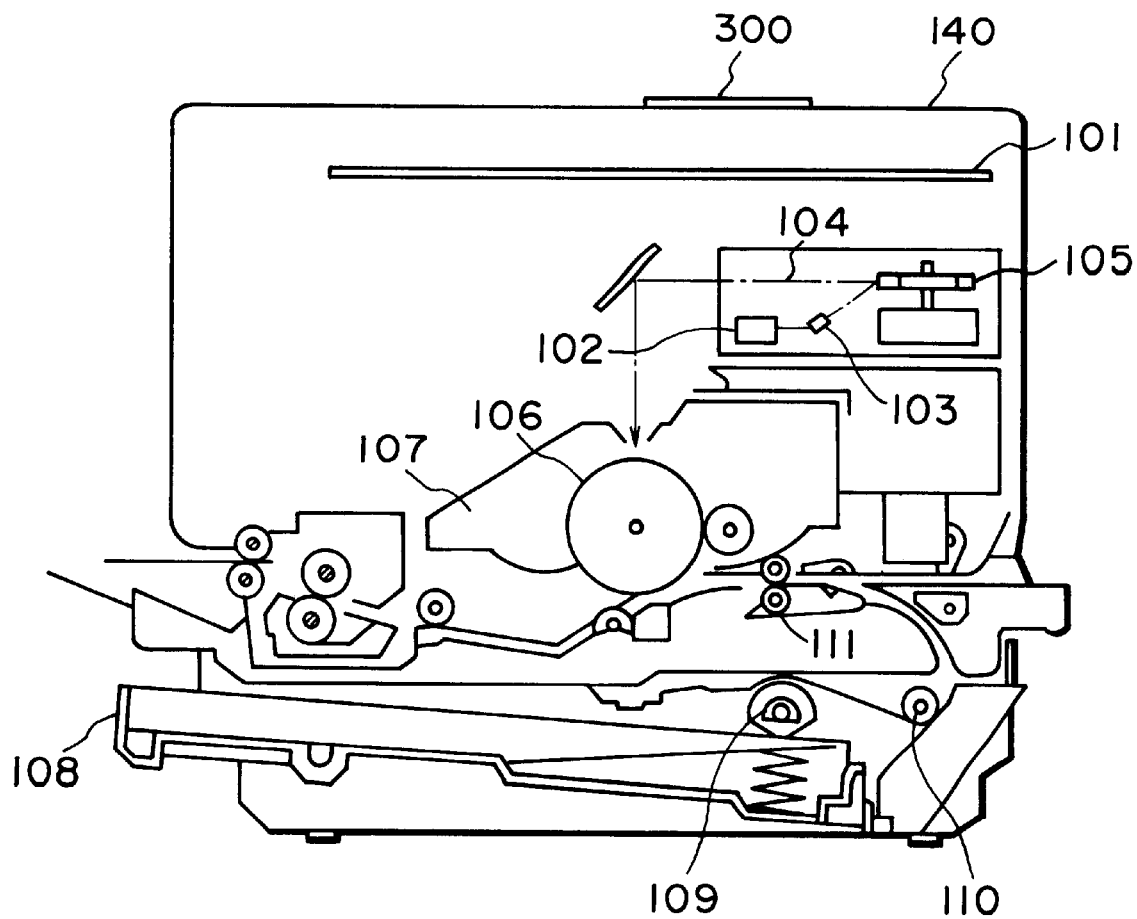
FIG. 5 is a sectional view showing an internal structure of a laser beam printer as an output unit.

FIG. 5 is a sectional view showing an internal structure of the laser beam printer 140 (to be referred to as an LBP hereinafter) of this embodiment. The LBP 140 can receive character pattern data from the processor 12 (or 12a) and can print it on printing paper.

Referring to FIG. 5, the LBP 140 forms an image on recording paper serving as a recording medium on the basis of a character pattern supplied from the processor (e.g., 12 in FIG. 1). The LBP 140 has an operation panel 300 having switches and an LED display, and a printer control unit 101 for performing overall control of the LBP 140 and analyzing character pattern data or the like supplied from the processor 12. This printer control unit 101 mainly converts character pattern data into a video signal and outputs it to a laser driver 102.

The laser driver 102 is a circuit for driving a semiconductor laser 103 and ON/OFF-controls a laser beam 104 emitted from the semiconductor laser 103 in accordance with an input video signal. The laser beam 104 is oscillated in the right-and-left direction by a rotary polygonal mirror 105 and scans an electrostatic drum 106, thereby forming an electrostatic latent image of a character pattern on the electrostatic drum 106. Note that the pulse width of a beam is variably controlled to divide one pixel into 256 to obtain a multigradation expression. After the latent image is developed by a developing unit 107 arranged around the electrostatic drum 106, the visible image is transferred to recording paper. This recording paper is a cut sheet. The cut sheets are stored in a paper cassette 108 attached to the LBP 140. Each cut sheet is picked up and conveyed by a paper pickup roller 109 and convey rollers 110 and 111 and is supplied to the electrostatic drum 106.

In each of the above embodiments, so-called outline font data, i.e., edge character data as a set of coordinate points are stored in the pattern data memory 13. However, the pattern data memory 13 need not store the outline data as font data. Non-dot matrix font data of a stroke format may be stored in the pattern data memory 13, as a matter of course.

Conversion parameter values from character size data to the character face size data may be different depending on target character fonts or types.

According to the present invention, as has been described above, designated character size data is converted in accordance with parameter data to generate a character pattern corresponding to any character face size data. For this reason, a document having high readability can be output regardless of the character size.

According to another aspect of the present invention, a highly readable character can be output without causing the character "deformation" phenomenon even in a character pattern having a small size.

What is claimed is:

1. A character processing apparatus comprising:

memory means for storing, for each one of at least one character size, conversion information used to convert a designated character size into a smaller character size for providing a character with improved readability;

size change means for reading the conversion information corresponding to a designated character size from said memory means, and changing the designated character size to another character size; and development means for, based on font data of a character to be developed, developing the character into a dot-data character of that other changed character size changed by said size change means, without changing a feed amount of the character.

2. An apparatus according to claim 1, further comprising print means for printing the dot-data character developed by said development means.

3. An apparatus according to claim 1, further comprising display means for displaying the dot-data character developed by said development means.

4. An apparatus according to claim 1, wherein the font data comprises outline font data.

5. An apparatus according to claim 1, wherein the font data comprises stroke font data.

6. An apparatus according to claim 1, wherein the conversion information stored in said memory means is provided to reduce the character size of a designated character.

7. A character processing apparatus comprising:

memory means for storing, for each one of at least one character type or each one of at least one character size, adjustment information indicating whether a narrowing process on a character width is to be performed upon development into a dot-data character pattern;

read means for reading the adjustment information based upon a character type or a character size of a character to be developed from said memory means;

determination means for determining whether the narrowing process is to be performed for the character to be developed based on the adjustment information read by said read means; and development means for developing the character into a dot-data character pattern by executing the narrowing process based on font data of the character if said determination means determines that the narrowing process is to be performed, and developing the character into a dot-data character pattern without executing the narrowing process based on font data of the character if said determination means determines that the narrowing process is not to be performed.

8. An apparatus according to claim 7, further comprising print means for printing the dot-data character developed by said development means.

9. An apparatus according to claim 7, further comprising display means for displaying the dot-data character developed by said development means.

10. An apparatus according to claim 7, wherein the font data comprises outline font data.

11. An apparatus according to claim 7, wherein the font data comprises stroke font data.

12. An apparatus according to claim 7, wherein the adjustment information stored in said memory means is provided to indicate whether the narrowing process is to be executed on the font data.

13. A character processing method using a memory which stores, for each one of at least one character size, conversion information used to convert a designated character size into a smaller character size for providing a character with improved readability, said method comprising the steps of:

reading the conversion information corresponding to a designated character size from the memory;

changing the designated character size to another character size; and based on font data of a character to be developed, developing the character into a dot-data character of that other changed character size, without changing a feed amount of the character.

14. A method according to claim 13, further comprising the step of printing the developed dot-data character.

15. A method according to claim 13, further comprising the step of displaying the developed dot-data character.

16. A method according to claim 13, wherein the font data comprises outline font data.

17. A method according to claim 13, wherein the font data comprises stroke font data.

18. A method according to claim 13, wherein the conversion information stored in the memory is provided to reduce the character size of a designated character.

19. A character processing method using a memory which stores, for each one of at least one character type or each one of at least one character size, adjustment information indicating whether a narrowing process on a character width is to be performed upon development into a dot-data character pattern, comprising the steps of:

reading the adjustment information based on a character type or a character size of a character to be developed from the memory;

determining whether the narrowing process is to be performed for the character to be developed based on the adjustment information read by said reading step; and developing the character into a dot-data character pattern by executing the narrowing process based on font data of the character if it is determined in said determining step that the narrowing process is to be performed, and developing the character into a dot-data character pattern without executing the narrowing process based on font data of the character if it is determined that the narrowing process is not to be performed.

20. A method according to claim 19, further comprising the step of printing the developed dot-data character.

21. A method according to claim 19, further comprising the step of displaying the developed dot-data character.

22. A method according to claim 19, wherein the font data comprises outline font data.

23. A method according to claim 19, wherein the font data comprises stroke font data.

24. A method according to claim 19, wherein the adjustment information stored in the memory is provided to indicate whether the narrowing process is to be executed on the font data.

25. A storage medium containing computer readable code for controlling a character processing apparatus using a memory which stores, for each one of at least one character size, conversion information used to convert a designated character size into a smaller character size for providing a character with improved readability, said code comprising:

code for reading the conversion information corresponding to a designated character size from the memory;

code for changing the designated character size to another character size; and code for, based on font data of a character to be developed, developing the character into a dot-data character of that other changed character size, without changing a feed amount of the character.

26. A storage medium according to claim 25, further comprising code for printing the developed dot-data character.

27. A storage medium according to claim 25, further comprising code for displaying the developed dot-data character.

28. A storage medium according to claim 25, wherein the font data comprises outline font data.

29. A storage medium according to claim 25, wherein the font data comprises stroke font data.

30. A storage medium according to claim 25, wherein the conversion information stored in the memory is provided to reduce the character size of a designated character.

31. A storage medium containing computer readable code for controlling a character processing apparatus using a memory which stores, for each one of at least one character type or each one of at least one character size, adjustment information indicating whether a narrowing process on a character width is to be performed upon development into a dot-data character pattern, said code comprising:

code for reading the adjustment information based on a character type or a character size of a character to be developed from the memory;

code for determining whether the narrowing process is to be performed for the character to be developed based on the adjustment information read by said code for reading; and code for developing the character into a dot-data character pattern by executing the narrowing process based on font data of the character if it is determined in said code for determining that the narrowing process is to be performed, and developing the character into a dot-data character pattern without executing the narrowing process based on font data of the character if it is determined that the narrowing process is not to be performed.

32. A storage medium according to claim 31, further comprising code for printing the developed dot-data character.

33. A storage medium according to claim 31, further comprising code for displaying the developed dot-data character.

34. A storage medium according to claim 31, wherein the font data comprises outline font data.

35. A storage medium according to claim 31, wherein the font data comprises stroke font data.

36. A storage medium according to claim 31, wherein the adjustment information stored in the memory is provided to indicate whether the narrowing process is to be executed on the font data.

37. A program product including computer readable code for controlling a character processing apparatus using a memory which stores, for each one of at least one character size, conversion information used to convert a designated character size into a smaller character size for providing a character with improved readability, said code comprising:

code for reading the conversion information corresponding to a designated character size from the memory;

code for changing the designated character size to another character size; and code for, based on font data of a character to be developed, developing the character into a dot-data character of that other changed character size, without changing a feed amount of the character.

38. A program product including computer readable code for controlling a character processing apparatus using a memory which stores, for each one of at least one character type or each one of at least one character size, adjustment information indicating whether a narrowing process on a character width is to be performed upon development into a dot-data character pattern, said code comprising:

code for reading the adjustment information based on a character type or a character size of a character to be developed from the memory;

code for determining whether the narrowing process is to be performed for the character to be developed based on the adjustment information read by said code for reading; and code for developing the character into a dot-data character pattern by executing the narrowing process based on font data of the character if it is determined in said code for determining that the narrowing process is to be performed, and developing the character into a dot-data character pattern without executing the narrowing process based on font data of the character if it is determined that the narrowing process is not to be performed.

* * * * *

UNITED STATES PATENT AND TRADEMARK OFFICE
CERTIFICATE OF CORRECTION

PATENT NO.      : 6,310,624 B1
DATED           : October 30, 2001
INVENTOR(S)     : Kiyoshi Watanabe It is certified that error appears in the above-identified patent and that said Letters Patent is hereby corrected as shown below:

Title page,
Item [56], References Cited, FOREIGN PATENT DOCUMENTS,
"1230093" should read -- 1-230093 --;
"2083583" should read -- 2-083583 --; and
"3246595" should read -- 3-246595 --.

Column 4,
Line 51, "line" should read -- line segment --.

Column 5,
Line 4, "of (narrowing)" should read -- (narrowing) of --.

Column 6,
Line 18, "from.said" should read -- from said --.

Signed and Sealed this

Tenth Day of December, 2002

JAMES E. ROGAN
*Director of the United States Patent and Trademark Office*